Patented Dec. 18, 1928.

1,695,585

UNITED STATES PATENT OFFICE.

ELBERT J. HALL, OF BERKELEY, CALIFORNIA, ASSIGNOR TO RUCKSTELL SALES AND MANUFACTURING COMPANY, OF BERKELEY, CALIFORNIA, A CORPORATION OF CALIFORNIA.

CHANGE-SPEED AXLE.

Application filed November 11, 1925. Serial No. 68,308.

This invention relates to transmission mechanisms for motor driven vehicles, and more particularly to such mechanisms in combination with the differential gear system ordinarily employed on the rear axles of automobiles.

The primary function of mechanisms of this type is to provide a variation of speeds in the rear axles, such variation being particularly desirable to supplement the speed changes afforded by the regular transmission. It is the primary object of my invention to provide an improved mechanism of this type which is more simple, compact and durable in construction and more efficient and smoother in operation than those heretofore known.

Another object of the invention is to provide a combined differential and planetary gear system in which the differential spider, which carries the differential and planetary pinions, is entirely supported by said pinions in a freely floating manner.

Another object of the invention is to provide a more compact and rigid assembly including a master ring gear having bevel gear teeth on an exterior face thereof and spur gear teeth on its inner surface, these latter teeth being in mesh with the planetary pinions in turn meshing with a sun gear directly adjacent one of the bevel gears of the differential mechanism. This arrangement provides a very compact construction wherein the drive from the master gear to the sun gear through the planetary pinions is in a direct line extending at right angles to the axle and closely adjacent the differential mechanism.

A further object of the invention is to provide an assembly of the type last stated in which a casing and cover plate are respectively secured to the opposite faces of the master gear and rotatably supported in anti-friction bearings in the main housing, and wherein the cover plate is provided with teeth cooperating with an axially movable toothed sleeve in a manner to either hold the sun gear against rotation or to lock the same non-rotatably to the master gear. In such construction the main thrusts of the spider and its cooperating mechanism are taken by these two anti-friction bearings.

With the above and other objects in view, my invention consists in the features of construction and operation set forth in the following specification and illustrated in the accompanying drawing. In such drawing annexed thereto and forming a part of this specification, I have shown one specific embodiment of my invention, but it will be understood that the invention can be otherwise embodied, and that the drawing is not to be construed as defining or limiting the scope of the invention, the claims appended to this specification being relied upon for that purpose.

Referring to the figures of the drawing:

Fig. 4 is a fragmentary view of Fig. 1, but showing certain elements shifted to another position.

Figure 1:
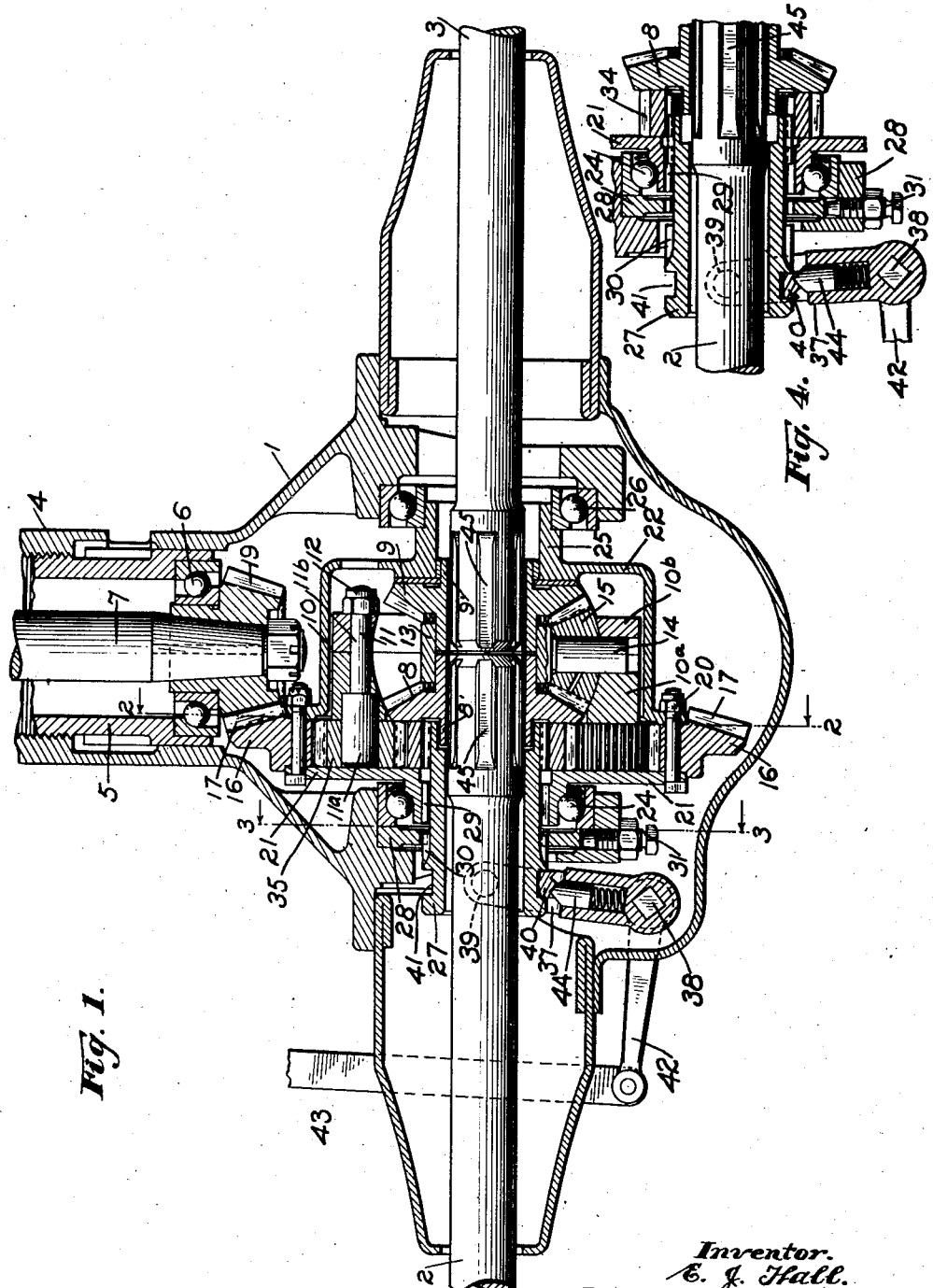
Fig. 1 is a horizontal sectional view through the differential housing of the rear axle of a motor vehicle.

Referring more specifically to the drawing by reference characters, 1 indicates the differential housing of the rear axle of a motor vehicle, and 2 and 3 indicate respectively the two axle shafts which are secured to the rear wheels of the vehicle. The housing 1 extends forwardly of the vehicle at 4 and supports a sleeve 5 and an anti-friction bearing 6 therein for the main drive or transmission shaft 7.

Figure 2:
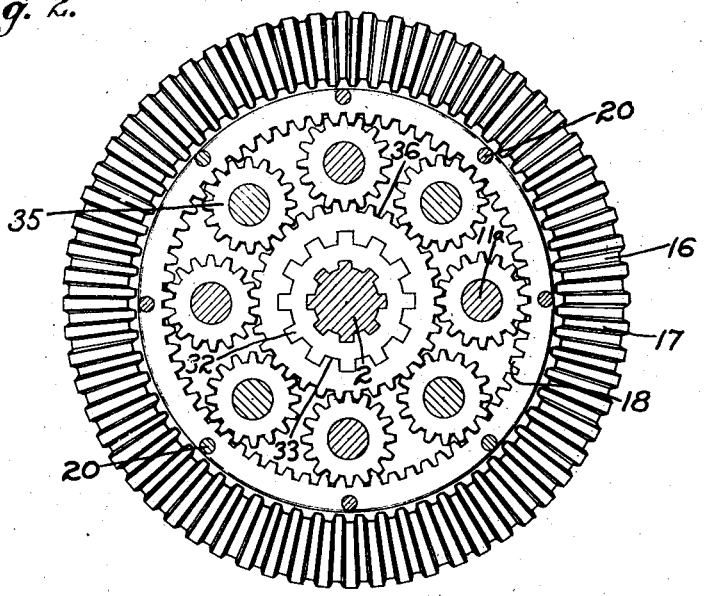
Fig. 2 is a cross section therethrough on line 2—2 of Fig. 1.
Figure 3:
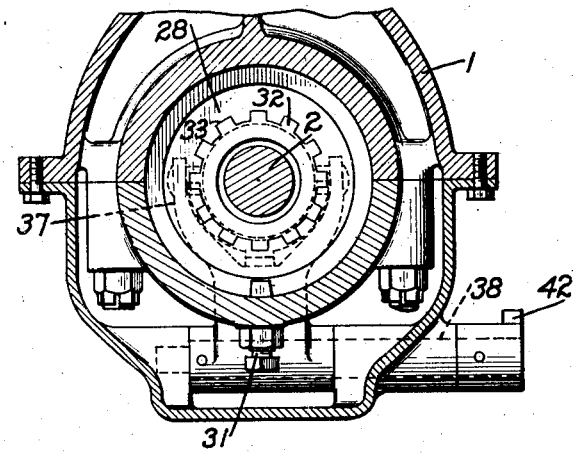
Fig. 3 is a cross section taken on line 3—3 of Fig. 1.

The differential mechanism within the housing comprises in part, two coaxial bevel gears 8 and 9 rotatably supported on their outwardly extending hubs 8' and 9' as hereinafter described. The spider 10 of the differential comprises two rings 10ª and 10ᵇ secured together by a plurality of bolts 11. I have provided eight of these bolts as illustrated in Fig. 2. Each of such bolts has a large-diametered outwardly-projecting portion 11ª and a reduced portion 11ᵇ, the portion 11ᵇ being threaded to receive a securing nut 12. The portion 11ª of each bolt is fitted securely in a shouldered socket in the ring 10ª whereby the bolts are held in a very rigid manner for a purpose hereinafter described. Mounted on the inner hubs of the bevel gears 8 and 9 is a ring 13 having radially extending axles 14 carrying the usual bevel pinions 15 and extending outwardly into the spider. These pinions 15 mesh with the bevel gears 8 and 9 in the well known manner.

The planetary gear system which, in combination with the differential gear system above described, constitutes my present invention, comprises the following mechanism:

I provide a one-piece master ring gear 16 with bevel gear teeth 17 formed on an exterior face thereof, and spur gear teeth 18 formed on its interior surface. As illustrated in Fig. 1, the teeth 17 are in mesh with a driving bevel gear 19 on the main driving shaft 7.

A plurality of bolts 20 secure a face plate 21 and a casing 22 respectively to the opposite faces of the ring gear 16. The face plate has an annular flanged portion 23 rotatably supported in the housing 1 by means of a ball bearing 24. The casing encloses the differential mechanism and is provided with an annular flanged portion 25 rotatably supported in the housing 1 by means of a ball bearing 26. The master gear and its cooperating mechanism are therefore rotatably supported on the anti-friction bearings 24 and 26.

A sleeve 27 is supported for limited axial movement within the housing 1 and coaxial of the bevel gears 8 and 9. This sleeve is supported by a ring 28 non-rotatably secured in the housing and by the inner toothed portion 29 of the flanged portion 23 of the face plate 21. The inner surface of the ring 28 is toothed to cooperate with teeth 30 on the sleeve, and a screw 31 threaded in the housing is adapted to secure the ring rigidly to the housing. The inner end of the sleeve is also toothed at 32 to cooperate with teeth 33 formed on the inner surface of the sun gear 34 supported thereon. This mounting permits free axial sliding movement of the sleeve within the gear, but prevents any relative rotation therebetween. As illustrated, the sun gear is directly adjacent the outer face of the bevel gear 8 and is coaxial therewith. The inner end of the sleeve is also recessed or cupped to supportingly receive the bevel gear hub 8' therein. The hub 9' of the bevel gear 9 is rotatably supported within the casing 10 as shown in Fig. 1.

The planetary pinions 35 of the planetary gear system are rotatably mounted on the large projecting ends 11ª of the bolts 11, within the ring gear 16 and outside the sun gear 34. Ordinarily three of these pinions are provided in mechanism of this type, but I provide a larger number of such pinions for a purpose hereinafter described. Eight of these pinions are illustrated in the drawing, and each pinion is in mesh with the inner teeth 18 of the ring gear and with teeth 36 formed on the periphery of the sun gear.

The sleeve 27 can be shifted axially by means of a yoke 37 mounted on a shaft 38 and connected at 39 to a shoe 40 mounted in an annular groove 41 in the sleeve. The shaft 38 can be rotated for the shifting operation by means of an arm 42 secured to one end thereof. A rod 43 connected to the free end of the arm may be extended to a position convenient to the operator. It will be understood that movement of the rod longitudinally in one direction or the other will rotate the shaft 38 and shift the sleeve axially in one direction or the other respectively.

A spring pressed plunger 44 is mounted in the body portion of the yoke and cooperates with two notches in the shoe 40 for holding the sleeve in one or the other of its shifted positions. This novel locking or holding mechanism comprises the subject matter of a copending application filed June 3, 1924, Serial No. 717,520, the mechanism being described in detail in such application.

As illustrated in Fig. 1, the inner ends of the axle shafts 2 and 3 are splined at 45. The axial bores of the bevel gears 8 and 9 for receiving these shafts are splined in like manner. It should be particularly noted that the construction is such that the parts can be entirely assembled in connection with the driving shaft 7 as shown in the drawing, and the axle shafts 2 and 3 thereafter slid axially into place within the bevel gears. When thus assembled, it will be seen that the axle shaft 2 acts as an inner support for the sleeve 27, and bevel gear 8.

The operation of my improved mechanism as illustrated and described is as follows:

The sleeve 27 has two axial operating positions. In Fig. 1 the sleeve is shown in its inner position wherein the sleeve is locked against rotation by the engagement of its teeth 30 with the cooperating teeth of the ring 28. Because of the cooperating teeth 32 and 33 of the sun gear and sleeve, the sun gear is therefore also locked against rotation. In such position of the parts, the drive from the ring gear 16 to the differential mechanism and the axle shafts 2 and 3 will be at a reduced speed, such reduction depending upon the relative number of teeth 18 and 36 on the ring gear and sun gear respectively.

In Fig. 4 the sleeve is shown in its outer position wherein the teeth 30 are disengaged to permit free rotation of the sleeve, and the teeth 32 on the sleeve are engaged with the teeth 33 of the sun gear 34 and the teeth 29 of the face plate 21. The face plate being rigidly secured to the ring gear, the sun gear and ring gear are, therefore, securely locked against any relative rotation. In such position of the parts, the sun gear, ring gear and their cooperating pinions 35 are locked to rotate only as a unit, and the drive from the ring gear to the differential mechanism and the axle shafts 2 and 3 will be direct.

The construction as described therefore provides two variations of speeds for each speed of the transmission shaft 7. In a vehicle having two speeds forward and one reverse, as in the "Ford," the adoption of my improved mechanism thereto would provide four speeds forward and two reverse speeds.

In a vehicle having three speeds forward and one reverse, my mechanism would provide six speeds forward and two reverse speeds. It should also be particularly noted that my improved mechanism is so constructed that the same is adapted to be mounted within the ordinary and original differential housing of the vehicle without any change or replacement of such housing whatsoever.

The construction and operation of my invention and its several advantages and improvements will be apparent without further description thereof. It should be particularly noted, however, that my planetary driving mechanism is arranged directly adjacent the bevel gear 8 of the differential mechanism, and the drive therethrough from the bevel gear 19 is directly inward from the point of engagement of the teeth of the gears 19 and 16. Such construction is much simpler and considerably more rigid and compact than similar devices heretofore known or used. The spider 10 is floatingly mounted upon the bevel pinions 15 and is entirely out of contact with the bevel gears 8 and 9. Furthermore, the differential spider being floatingly mounted, the thrust of the bevel gears 8 and 9 is taken entirely by the main and anti-friction bearings 24 and 26 through the hub 25 at one side and at the other side by the sun gear 34 which is firmly supported by the plate 25. By using several planetary pinions 35, these pinions are mounted closely adjacent to each other in a manner to also serve as roller bearings between the ring gear and sun gear, thus eliminating the usual roller or ball bearings in such mechanisms. This arrangement forms a very solid and substantial drive between such elements, and serves to properly equalize and carry the load. The face plate 21 also serves as a cover plate for housing the planetary mechanism, and in cooperation with the sleeve 27 provides a most novel means for rigidly locking the sun gear and ring gear against relative rotation.

Having thus described my invention, what I claim and desire to secure by Letters Patent is:

1. A differential gear system and a planetary gear system comprising in combination, a pair of coaxial bevel gears, a spider surrounding the bevel gears and carrying a plurality of bevel pinions in mesh with both bevel gears, a plurality of bolts in the spider, the ends of the bolts projecting beyond one face of the spider, a ring gear, a sun gear coaxial with the bevel gears, a plurality of pinions each rotatably mounted on one of the said bolt projections and in mesh with the ring gear and sun gear, and means optionally operative to hold the sun gear against rotation or to lock the sun gear and ring gear and their cooperating pinions to rotate only as a unit, the spider being floatingly supported entirely by the bevel pinions and their supporting axles.

2. In a rear axle system, a differential mechanism including co-axial bevel gears, bevel pinions intermeshed therewith, a rotatable spider for carrying the bevel pinions, a planetary change-speed gearing associated therewith and having pinions journaled on the spider, and a ring gear carried by the differential driving gear, a housing around the differential and planetary mechanisms, said housing being supported at each end by anti-friction thrust bearings, the parts being so arranged that the thrust of the bevel gear at one side is imparted directly to the end of the housing and at the other side is imparted to the end of the housing through the sun gear of the planetary mechanism.

ELBERT J. HALL.